US009911951B2

(12) United States Patent
DeKeuster et al.

(10) Patent No.: US 9,911,951 B2
(45) Date of Patent: Mar. 6, 2018

(54) BATTERY MODULE COMPRESSED CELL ASSEMBLY

(71) Applicant: Johnson Controls Technology Company, Holland, MI (US)

(72) Inventors: Richard M. DeKeuster, Racine, WI (US); Jason D. Fuhr, Sussex, WI (US); Robert J. Mack, Milwaukee, WI (US); Jonathan P. Lobert, Hartford, WI (US); Jennifer L. Czarnecki, Franklin, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 581 days.

(21) Appl. No.: 14/501,241

(22) Filed: Sep. 30, 2014

(65) Prior Publication Data
US 2016/0093849 A1    Mar. 31, 2016

(51) Int. Cl.
*H01M 2/10* (2006.01)
*H01M 2/02* (2006.01)
(Continued)

(52) U.S. Cl.
CPC ..... *H01M 2/1077* (2013.01); *H01M 10/0481* (2013.01); *H01M 10/0525* (2013.01); *H01M 10/425* (2013.01); *H01M 2220/20* (2013.01)

(58) Field of Classification Search
CPC ........ H01M 2/02; H01M 2/10; H01M 2/1077; H01M 2/0207; H01M 2/1061; H01M 10/0525; H01M 10/425
See application file for complete search history.

(56) References Cited

U.S. PATENT DOCUMENTS 3,306,777 A * 2/1967 Reid ............... H01M 6/48
429/153
6,080,508 A 6/2000 Dasgupta et al.
(Continued)

FOREIGN PATENT DOCUMENTS

EP    1753058    2/2007
EP    1753070    2/2007
(Continued)

OTHER PUBLICATIONS

PCT/US2015/037090 International Search Report and Written Opinion dated Oct. 9, 2015.

*Primary Examiner* — Kenneth J Douyette
(74) *Attorney, Agent, or Firm* — Fletcher Yoder, P.C.

(57) ABSTRACT

A battery module includes a housing including a first interior surface, a second interior surface opposite the first interior surface, and a compressed cell assembly disposed within an interior space of the housing between the first and second interior surfaces. The compressed cell assembly includes a plurality of prismatic battery cells arranged in a cell stack that includes a first end, a second end opposite the first end, and a retaining wall disposed between the first end of the cell stack and the first interior surface of the housing. The retaining wall includes a first surface in contact with the first end of the cell stack and a second surface opposite the first surface that contacts the first interior surface of the housing. The first and second interior surfaces are configured to maintain the compressed cell assembly in a compressed state having a compression force above a predetermined threshold.

24 Claims, 9 Drawing Sheets

(51) Int. Cl.
*H01M 10/42* (2006.01)
*H01M 10/0525* (2010.01)
*H01M 10/04* (2006.01)

(56) References Cited

U.S. PATENT DOCUMENTS

| | | | |
|---|---|---|---|
| 6,709,783 B2 | 3/2004 | Ogata et al. |
| 7,531,270 B2 | 5/2009 | Buck et al. |
| 7,678,493 B2 | 3/2010 | Morita et al. |
| 7,740,978 B2 | 6/2010 | Hamada et al. |
| 7,816,029 B2 | 10/2010 | Takamatsu et al. |
| 7,867,292 B2 | 1/2011 | Bechtold et al. |
| 7,892,669 B2 | 2/2011 | Yang et al. |
| 7,960,051 B2 | 6/2011 | Matsuoka et al. |
| 8,039,141 B2 | 10/2011 | Jeon et al. |
| 8,071,234 B2 | 12/2011 | Okada et al. |
| 8,124,262 B2 | 2/2012 | Okada et al. |
| 8,163,419 B2 | 4/2012 | Marukawa et al. |
| 8,163,420 B2 | 4/2012 | Okada et al. |
| 8,177,206 B2 | 5/2012 | Scheuerman et al. |
| 8,256,552 B2 | 9/2012 | Okada |
| 8,309,247 B2 | 11/2012 | Shinyashiki et al. |
| 8,313,854 B2 | 11/2012 | Origuchi et al. |
| 8,323,819 B2 | 12/2012 | Lee et al. |
| 8,329,330 B2 | 12/2012 | Okada |
| 8,389,145 B2 | 3/2013 | Graban |
| 8,409,743 B2 | 4/2013 | Okada et al. |
| 8,465,862 B2 | 6/2013 | Kosugi |
| 8,481,191 B2 | 7/2013 | Hermann |
| 8,507,121 B2 | 8/2013 | Saito et al. |
| 8,507,122 B2 | 8/2013 | Saito et al. |
| 8,530,069 B2 | 9/2013 | Wood et al. |
| 8,531,160 B2 | 9/2013 | Moorhead et al. |
| 8,541,126 B2 | 9/2013 | Hermann et al. |
| 8,551,640 B2 | 10/2013 | Hedrich et al. |
| 8,586,228 B2 | 11/2013 | Lee et al. |
| 8,592,067 B2 | 11/2013 | Yokoyama et al. |
| 8,598,884 B2 | 12/2013 | Yano et al. |
| 8,647,762 B2 | 2/2014 | Schwab et al. |
| 8,703,321 B2 | 4/2014 | Kim et al. |
| 8,765,285 B2 | 7/2014 | Kim |
| 8,771,864 B2 | 7/2014 | Lim |
| 8,790,810 B2 | 7/2014 | McLaughlin et al. |
| 8,790,812 B2 | 7/2014 | Iritani et al. |
| 8,822,064 B2 | 9/2014 | Culver et al. |
| 2005/0214638 A1 | 9/2005 | Asahina et al. |
| 2005/0250005 A1 | 11/2005 | Bacon et al. |
| 2006/0115720 A1 | 6/2006 | Kim |
| 2007/0026303 A1 | 2/2007 | Jeon et al. |
| 2007/0026304 A1 | 2/2007 | Jeon et al. |
| 2009/0226774 A1* | 9/2009 | Friscia ............... H01M 8/186 429/532 |
| 2010/0273042 A1 | 10/2010 | Buck et al. |
| 2011/0003193 A1 | 1/2011 | Park et al. |
| 2011/0097619 A1 | 4/2011 | Park |
| 2011/0206948 A1* | 8/2011 | Asai ................... H01M 2/0473 429/7 |
| 2012/0003526 A1 | 1/2012 | Kume et al. |
| 2012/0028084 A1 | 2/2012 | Park et al. |
| 2012/0247107 A1* | 10/2012 | Balk ................... H01M 2/0217 60/718 |
| 2012/0286706 A1 | 11/2012 | Ohkura |
| 2013/0002017 A1 | 1/2013 | Yano et al. |
| 2013/0108908 A1 | 5/2013 | Omura et al. |
| 2013/0207459 A1* | 8/2013 | Schroder ............ H01M 2/1077 307/10.1 |
| 2013/0273404 A1 | 10/2013 | Ochi et al. |
| 2013/0280590 A1 | 10/2013 | Schaefer et al. |
| 2014/0065458 A1 | 3/2014 | Hamada et al. |
| 2014/0093751 A1* | 4/2014 | Schaefer ............ H01M 2/1072 429/7 |
| 2014/0123472 A1 | 5/2014 | Iwase |
| 2014/0205876 A1 | 7/2014 | Murata |
| 2014/0220410 A1 | 8/2014 | Maguire et al. |
| 2014/0308556 A1 | 10/2014 | Obata |

FOREIGN PATENT DOCUMENTS

| | | |
|---|---|---|
| EP | 1852924 | 11/2007 |
| EP | 1958276 | 8/2008 |
| EP | 2065963 | 6/2009 |
| EP | 2490278 | 8/2012 |

\* cited by examiner

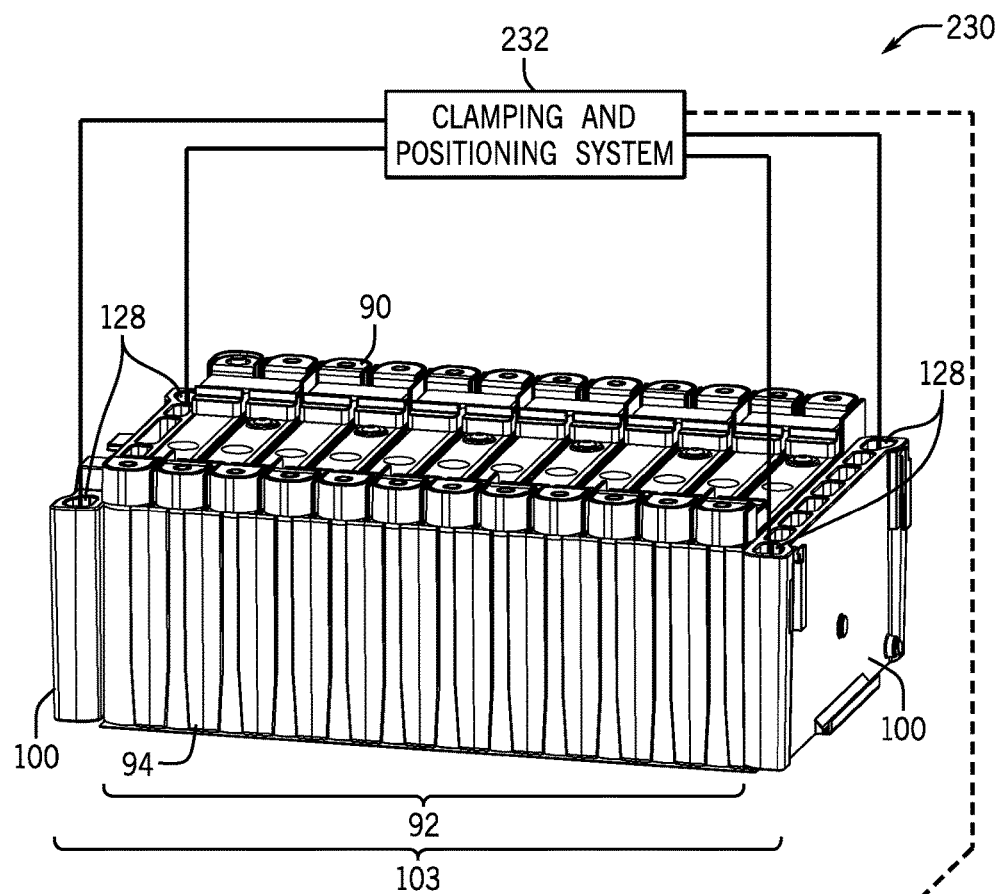
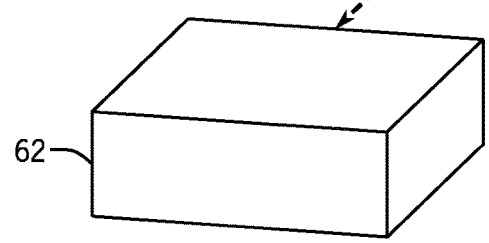
FIG. 12

BATTERY MODULE COMPRESSED CELL ASSEMBLY

BACKGROUND

The present disclosure relates generally to the field of batteries and battery modules. More specifically, the present disclosure relates to a stacked cell manufacturing scheme for battery modules.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

A vehicle that uses one or more battery systems for providing all or a portion of the motive power for the vehicle can be referred to as an xEV, where the term "xEV" is defined herein to include all of the following vehicles, or any variations or combinations thereof, that use electric power for all or a portion of their vehicular motive force. For example, xEVs include electric vehicles (EVs) that utilize electric power for all motive force. As will be appreciated by those skilled in the art, hybrid electric vehicles (HEVs), also considered xEVs, combine an internal combustion engine propulsion system and a battery-powered electric propulsion system, such as 48 Volt (V) or 130V systems. The term HEV may include any variation of a hybrid electric vehicle. For example, full hybrid systems (FHEVs) may provide motive and other electrical power to the vehicle using one or more electric motors, using only an internal combustion engine, or using both. In contrast, mild hybrid systems (MHEVs) disable the internal combustion engine when the vehicle is idling and utilize a battery system to continue powering the air conditioning unit, radio, or other electronics, as well as to restart the engine when propulsion is desired. The mild hybrid system may also apply some level of power assist, during acceleration for example, to supplement the internal combustion engine. Mild hybrids are typically 96V to 130V and recover braking energy through a belt or crank integrated starter generator. Further, a micro-hybrid electric vehicle (mHEV) also uses a "Stop-Start" system similar to the mild hybrids, but the micro-hybrid systems of a mHEV may or may not supply power assist to the internal combustion engine and operates at a voltage below 60V. For the purposes of the present discussion, it should be noted that mHEVs typically do not technically use electric power provided directly to the crankshaft or transmission for any portion of the motive force of the vehicle, but an mHEV may still be considered as an xEV since it does use electric power to supplement a vehicle's power needs when the vehicle is idling with internal combustion engine disabled and recovers braking energy through an integrated starter generator. In addition, a plug-in electric vehicle (PEV) is any vehicle that can be charged from an external source of electricity, such as wall sockets, and the energy stored in the rechargeable battery packs drives or contributes to drive the wheels. PEVs are a subcategory of EVs that include all-electric or battery electric vehicles (BEVs), plug-in hybrid electric vehicles (PHEVs), and electric vehicle conversions of hybrid electric vehicles and conventional internal combustion engine vehicles.

xEVs as described above may provide a number of advantages as compared to more traditional gas-powered vehicles using only internal combustion engines and traditional electrical systems, which are typically 12V systems powered by a lead acid battery. For example, xEVs may produce fewer undesirable emission products and may exhibit greater fuel efficiency as compared to traditional internal combustion vehicles and, in some cases, such xEVs may eliminate the use of gasoline entirely, as is the case of certain types of EVs or PEVs.

As technology continues to evolve, there is a need to provide improved power sources, particularly battery modules, for such vehicles. In some traditional configurations, the battery cells of a battery module are tightly packed and maintained within the battery housing with an attached clamping mechanism to, for example, maximize energy density of the battery module. Traditional clamping mechanisms often include external features of the battery module (e.g., to facilitate access to the clamping mechanism for manufacture) and are activated after all of the battery cells have been positioned within the battery module. It is now recognized that such clamping mechanisms can add bulk, weight, and some complexity to the battery module and assembly process.

It is further recognized that, in certain systems, differences in the thickness between battery cells as a result of manufacturing variability can prove problematic when positioning the battery cells within the battery housing. Accordingly, it is now recognized that enhancements to such battery module manufacturing processes, battery module reproducibility, and so forth, may be desirable by providing mechanisms for arranging the battery cells within the battery housing that allow greater variability in the dimensions of each battery cell, while still enabling a desired degree of compression/clamping.

SUMMARY

A summary of certain disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below. The present disclosure relates to batteries and battery modules. More specifically, the present disclosure relates to lithium ion battery cells that may be used in vehicular contexts (e.g., xEVs) as well as other energy storage/expending applications (e.g., energy storage for an electrical grid).

The present disclosure relates to a battery module includes a housing including a first interior surface and a second interior surface opposite the first interior surface. The battery module also includes a compressed cell assembly disposed within an interior space of the housing between the first and second interior surfaces. The compressed cell assembly includes a plurality of prismatic battery cells arranged in a cell stack that includes a first end and a second end opposite the first end. The compressed cell assembly also includes a retaining wall disposed between the first end of the cell stack and the first interior surface of the housing. The retaining wall includes a first surface in contact with the first end of the cell stack. The retaining wall also includes a second surface opposite the first surface that contacts the first interior surface of the housing. The first and second interior surfaces are configured to maintain the compressed cell assembly in a compressed state having a compression force above a predetermined threshold.

The present disclosure also relates to a battery module includes a housing including a first interior surface and a second interior surface opposite the first interior surface. The battery module also includes a plurality of prismatic battery cells disposed in an interior space of the housing of the battery module. The plurality of prismatic battery cells are arranged in a cell stack that includes a first end and a second end. The battery module also includes a first retaining wall disposed between the first end of the cell stack and the first interior surface of the housing. Additionally, the battery module includes a second retaining wall disposed between the second end of the cell stack and the second interior surface of the housing. The first and second retaining walls are configured to compress the cell stack.

The present disclosure also relates to a method for manufacturing a battery module. The method includes assembling a plurality of prismatic battery cells into a cell stack. The method also includes compressing the cell stack into a compressed cell stack. Further, the method includes inserting the compressed cell stack within a housing of a battery module. Additionally, the method includes maintaining a compression force on the compressed cell stack using the housing.

DRAWINGS

Various aspects of the disclosure may be better understood upon reading the following detailed description and upon reference to the drawings in which:

FIG. 12 is a partial schematic diagram of a system for manufacturing a battery module having a compressed cell assembly, the system including a clamping mechanism for compressing the compressed cell assembly, in accordance with an embodiment of the present approach;

Figure 3:
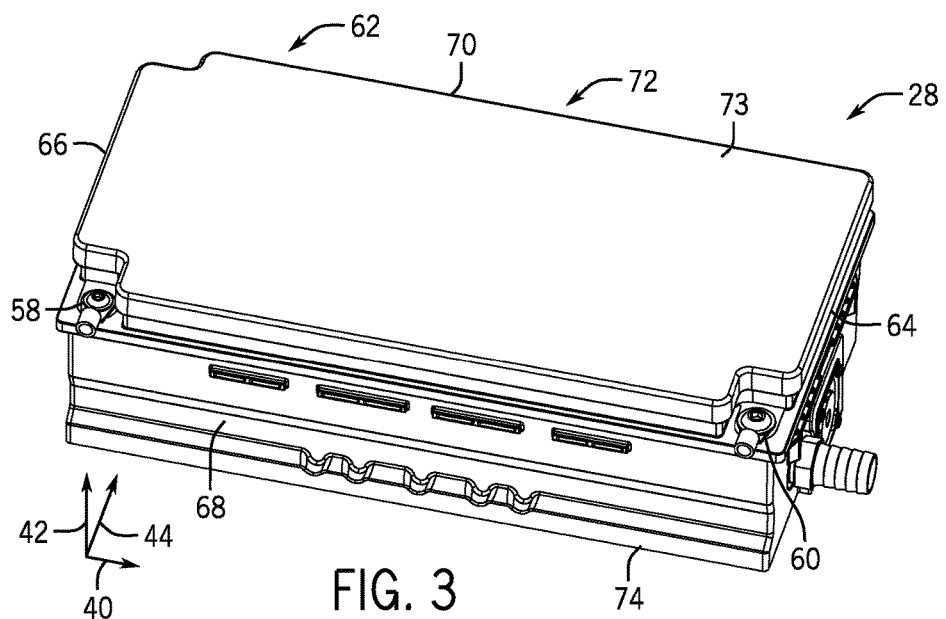
FIG. 3 is a front top perspective view of a battery module, in accordance with an embodiment of the present approach.
Figure 13:
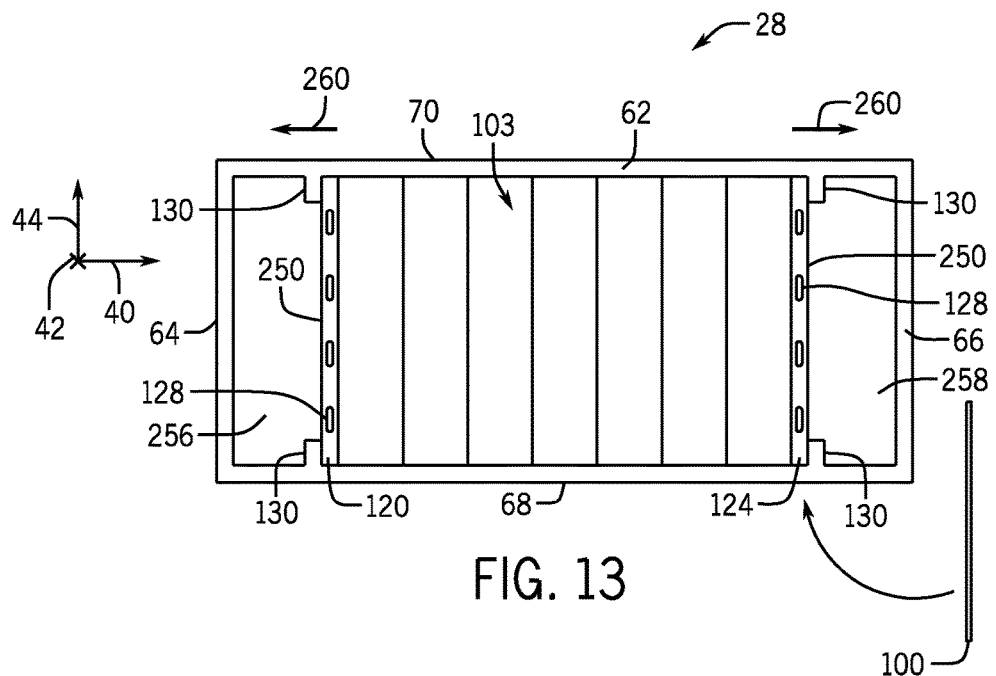
Figure 14:
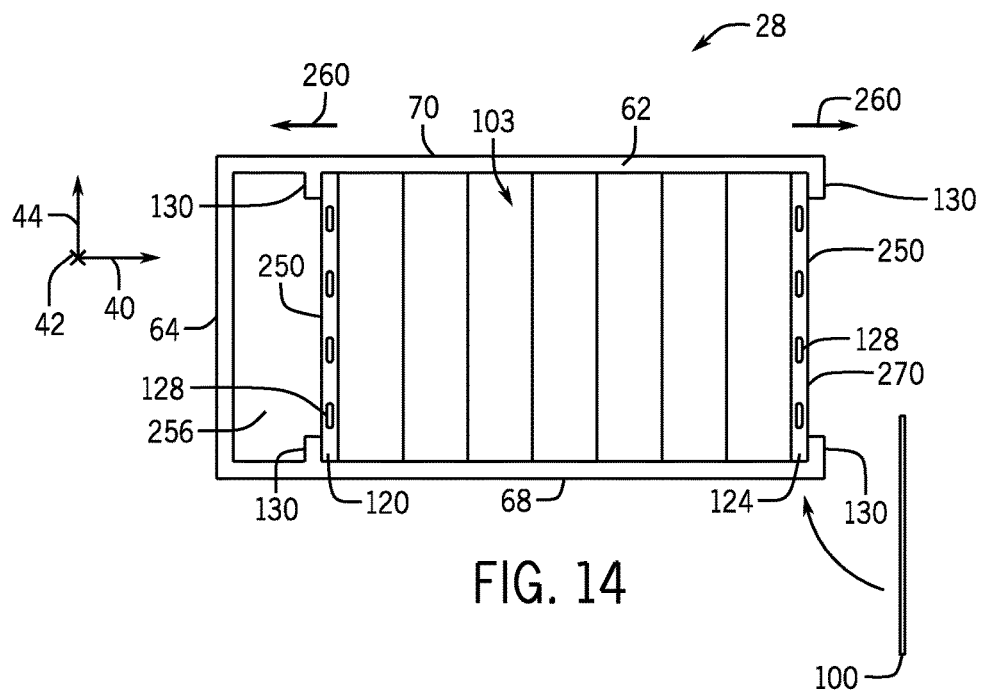

FIG. 13 is a schematic diagram of the battery module of FIG. 3 having two retaining walls maintained in position by retaining tabs of the housing of the battery module, in accordance with an embodiment of the present approach; and FIG. 14 is a schematic diagram of a battery module and having two retaining walls maintained in position by retaining tabs of the housing, where one of the retaining walls functions as an end portion of the housing, in accordance with an embodiment of the present approach.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The battery systems described herein may be used to provide power to various types of electric vehicles (xEVs) and other high voltage energy storage/expending applications (e.g., electrical grid power storage systems). Such battery systems may include one or more battery modules, each battery module having a housing and a number of battery cells (e.g., Lithium-ion (Li-ion) electrochemical cells) arranged within the housing to provide particular voltages and/or currents useful to power, for example, one or more components of an xEV. As another example, battery modules in accordance with present embodiments may be incorporated with or provide power to stationary power systems (e.g., non-automotive systems).

Present embodiments include physical battery module features, assembly components, manufacturing and assembling techniques, and so forth, that facilitate the manufacture of battery modules and systems in a manner that may enable a wider tolerance of battery cell dimensions, a wider degree of variability within that tolerance, and a potential reduction in size and weight of the battery modules and systems. Indeed, using the approaches described herein, it may be possible to design certain advanced battery modules (e.g., Li-ion battery modules) to have a desired form factor (e.g., dimensions corresponding to a traditional lead acid battery), without having to use actuating clamping mechanisms to compress the battery cells. Indeed, it is now recognized that actuating clamping mechanisms, which are discussed in further detail below, may be altogether eliminated from a battery module using the retaining and compression features of the present disclosure. Such elimination can reduce the complexity and cost associated with battery module manufacture.

Despite such complexity and cost, in traditional systems, actuating clamping mechanisms that are integral with the module (e.g., the module housing) tend to be typical. This is because certain types of battery cells are susceptible to a greater degree of swelling in one direction compared to another (e.g., as in certain prismatic or other similarly shaped battery cells), and are clamped down to maintain desired energy density and performance during operation (e.g., by maintaining the degree of swelling of the battery cells to under a certain amount). In particular, prismatic battery cells may swell in a thickness direction and may be clamped down to reduce the swelling. Many traditional actuating clamping mechanisms used to provide such clamping include actuating components incorporated into (e.g., attached to, disposed within, or integrated with) the battery module that can potentially add considerable weight to the battery module and add complexity to manufacturing. Such actuating clamping mechanisms are intended to denote clamping mechanisms that are integral with the battery module (i.e., retained with the battery module after manufacture), and that are actuatable within the battery module to produce a desired clamping force against the battery cells.

For example, in one traditional manufacturing process, battery cells may be placed in a housing of a battery module, and the battery cells may then be compressed, for example against each other and/or against the housing, by an actuating clamping mechanism (e.g., an external cranking or bolt mechanism). Such actuating clamping mechanisms may include, for example, a clamp attached to the battery module, a movable plate disposed within the battery module housing that may be actuated (e.g., using a crank, a clamp, an adjustable tie and bolt mechanism) to abut against the battery cells, or an adjustable tie and bolt mechanism used to actuate components (e.g., outer or inner walls) of the battery module housing. These additional clamping steps can require additional time and equipment during manufacture, in addition to the bulky and/or heavy actuating clamping components. Indeed, because the actuating clamping components should be robust, they are generally made from strong, heavy materials (e.g., metals).

As will be described in more detail below, the present embodiments include battery modules having battery cells arranged in a compressed stack, where the compressed stack is maintained within the battery module using the housing of the battery module itself. In certain embodiments, the housing may be used in combination with additional spacing features that are simply placed against features of the housing to maintain the compressed state of the stack.

Figure 1:
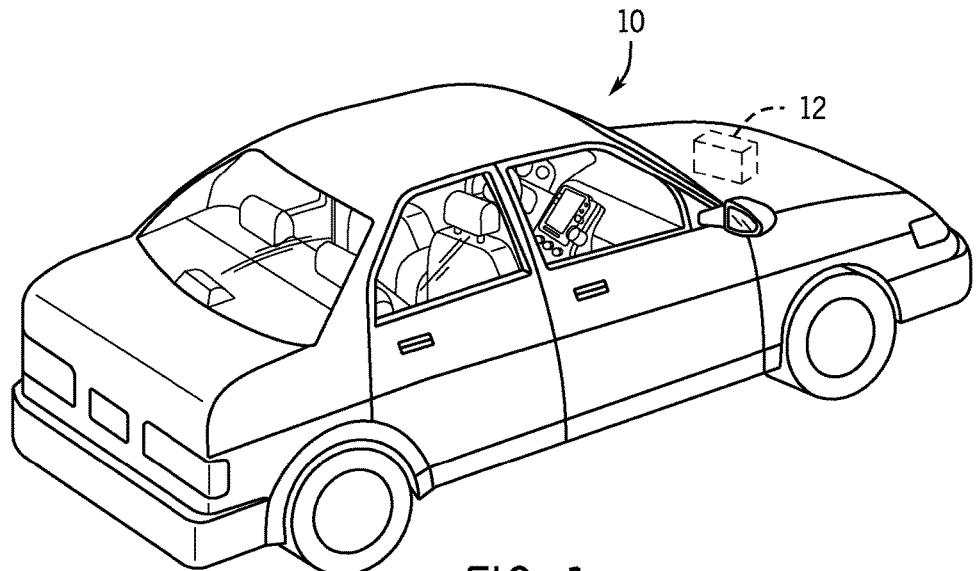
FIG. 1 is a perspective view of a vehicle (an xEV) having a battery system contributing all or a portion of the power for the vehicle, in accordance with an embodiment of the present approach.

Again, the battery modules configured in accordance with present embodiments may be employed in any number of energy expending systems (e.g., vehicular contexts and stationary power contexts). To facilitate discussion, embodiments of the battery modules described herein are presented in the context of advanced battery modules (e.g., Li-ion battery modules) employed in xEVs. With the foregoing in mind, FIG. 1 is a perspective view of such a vehicle 10 (e.g., an xEV), which may utilize a regenerative braking system. Although the following discussion in presented in relation to vehicles with regenerative braking systems, the techniques described herein are adaptable to other vehicles that capture/ store electrical energy with a battery, which may include electric-powered and gas-powered vehicles.

It may be desirable for a battery system 12 to be largely compatible with traditional vehicle designs. Accordingly, the battery system 12 may be placed in a location in the vehicle 10 that would have housed a traditional battery system. For example, as illustrated, the vehicle 10 may include the battery system 12 positioned similarly to a lead-acid battery of a typical combustion-engine vehicle (e.g., under the hood of the vehicle 10). Furthermore, as will be described in more detail below, the battery system 12 may be positioned to facilitate managing temperature of the battery system 12. For example, in some embodiments, positioning a battery system 12 under the hood of the vehicle 10 may enable an air duct to channel airflow over the battery system 12 and cool the battery system 12.

Figure 2:
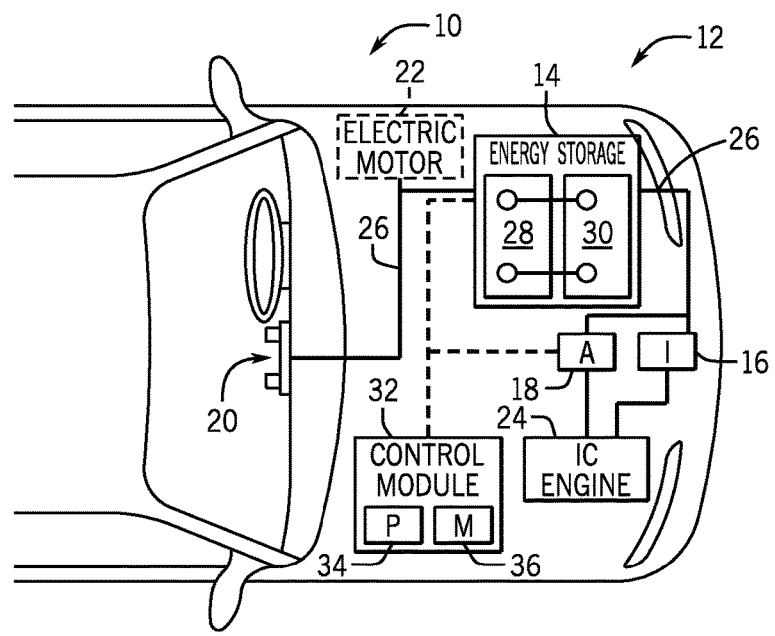
FIG. 2 is a cutaway schematic view of the xEV embodiment of FIG. 1, in the form of a hybrid electric vehicle (HEV) having a battery module with compression features configured in accordance with an embodiment of the present approach.

A more detailed view of the battery system 12 is described in FIG. 2. As depicted, the battery system 12 includes an energy storage component 14 coupled to an ignition system 16, an alternator 18, a vehicle console 20, and optionally to an electric motor 22. Generally, the energy storage component 14 may capture/store electrical energy generated in the vehicle 10 and output electrical energy to power electrical devices in the vehicle 10.

In other words, the battery system 12 may supply power to components of the vehicle's electrical system, which may include radiator cooling fans, climate control systems, electric power steering systems, active suspension systems, auto park systems, electric oil pumps, electric super/turbochargers, electric water pumps, heated windscreen/defrosters, window lift motors, vanity lights, tire pressure monitoring systems, sunroof motor controls, power seats, alarm systems, infotainment systems, navigation features, lane departure warning systems, electric parking brakes, external lights, or any combination thereof. In the depicted embodiment, the energy storage component 14 supplies power to the vehicle console 20 and the ignition system 16, which may be used to start (e.g., crank) the internal combustion engine 24.

Additionally, the energy storage component 14 may capture electrical energy generated by the alternator 18 and/or the electric motor 22. In some embodiments, the alternator 18 may generate electrical energy while the internal combustion engine 24 is running. More specifically, the alternator 18 may convert the mechanical energy produced by the rotation of the internal combustion engine 24 into electrical energy. Additionally or alternatively, when the vehicle 10 includes an electric motor 22, the electric motor 22 may generate electrical energy by converting mechanical energy produced by the movement of the vehicle 10 (e.g., rotation of the wheels) into electrical energy. Thus, in some embodiments, the energy storage component 14 may capture electrical energy generated by the alternator 18 and/or the electric motor 22 during regenerative braking. As such, the alternator and/or the electric motor 22 are generally referred to herein as a regenerative braking system.

To facilitate capturing and supplying electric energy, the energy storage component 14 may be electrically coupled to the vehicle's electric system via a bus 26. For example, the bus 26 may enable the energy storage component 14 to receive electrical energy generated by the alternator 18 and/or the electric motor 22. Additionally, the bus 26 may enable the energy storage component 14 to output electrical energy to the ignition system 16 and/or the vehicle console 20. Accordingly, when a 12 volt battery system 12 is used, the bus 26 may carry electrical power typically between 8-18 volts.

Additionally, as depicted, the energy storage component 14 may include multiple battery modules. For example, in the depicted embodiment, the energy storage component 14 includes a lithium ion (e.g., a first) battery module 28 and a lead-acid (e.g., a second) battery module 30, which each includes one or more battery cells. In other embodiments, the energy storage component 14 may include any number of battery modules. Additionally, although the lithium ion battery module 28 and lead-acid battery module 30 are depicted adjacent to one another, they may be positioned in different areas around the vehicle. For example, the lead-acid battery module may be positioned in or about the interior of the vehicle 10 while the lithium ion battery module 28 may be positioned under the hood of the vehicle 10.

In some embodiments, the energy storage component 14 may include multiple battery modules to utilize multiple different battery chemistries. For example, when the lithium ion battery module 28 is used, performance of the battery system 12 may be improved since the lithium ion battery chemistry generally has a higher coulombic efficiency and/or a higher power charge acceptance rate (e.g., higher maximum charge current or charge voltage) than the lead-acid battery chemistry. As such, the capture, storage, and/or distribution efficiency of the battery system 12 may be improved.

To facilitate controlling the capturing and storing of electrical energy, the battery system 12 may additionally include a control module 32. More specifically, the control module 32 may control operations of components in the battery system 12, such as relays (e.g., switches) within energy storage component 14, the alternator 18, and/or the electric motor 22. For example, the control module 32 may regulate amount of electrical energy captured/supplied by each battery module 28 or 30 (e.g., to de-rate and re-rate the battery system 12), perform load balancing between the battery modules 28 and 30, determine a state of charge of each battery module 28 or 30, determine temperature of each battery module 28 or 30, control voltage output by the alternator 18 and/or the electric motor 22, and the like.

Accordingly, the control unit 32 may include one or processor 34 and one or more memory 36. More specifically, the one or more processor 34 may include one or more application specific integrated circuits (ASICs), one or more field programmable gate arrays (FPGAs), one or more general purpose processors, or any combination thereof. Additionally, the one or more memory 36 may include volatile memory, such as random access memory (RAM), and/or non-volatile memory, such as read-only memory (ROM), optical drives, hard disc drives, or solid-state drives. In some embodiments, the control unit 32 may include portions of a vehicle control unit (VCU) and/or a separate battery control module. Furthermore, as depicted, the lithium ion battery module 28 and the lead-acid battery module 30 are connected in parallel across their terminals. In other words, the lithium ion battery module 28 and the lead-acid module 30 may be coupled in parallel to the vehicle's electrical system via the bus 26.

The lithium ion battery modules 28 may have any one of a variety of different shapes, sizes, output voltages, capacities, and so forth, and the present disclosure is generally intended to apply to different variations of the shapes and sizes of the modules illustrated in the figures. Keeping this in mind, FIG. 3 is a front top perspective view of one embodiment of the battery module 28. To facilitate discussion of the battery module 28 and the various assemblies and components thereof, a Z axis 40 is defined as extending through the length of battery module 28, a Y axis 42 is defined as extending through the height of the battery module 28 (transverse to the length in a first direction), and an X axis 44 is defined as extending through a width of the battery module 28 (transverse to the length and the height).

The battery module 28 includes a first terminal 58 (e.g., a negative terminal) and a second terminal 60 (e.g., a positive terminal) that may be coupled to an electrical load (e.g., circuit) for providing power to the xEV 10. In other embodiments, the battery module 28 may have more than two terminals, for example, to provide different voltages for different loads via connections across different terminal combinations.

The battery module 28 includes a housing 62 for packaging or containing a plurality of battery cells (FIG. 4) and other components of the battery module 28. For example, as will be described in more detail below, the housing 62 may package a plurality of prismatic battery cells. The housing 62 may include two end portions 64 and 66 (e.g., disposed along the Z axis 40), two side portions 68 and 70 (e.g., disposed along the X axis 44), a top portion 72 (e.g., fitted with a top cover 73), and a bottom portion 74. The housing 62 may be metallic (e.g., made from steel, aluminum, or another suitable metal), may be polymeric (e.g., polypropylene, acrylonitrile butadiene styrene (ABS), a polystyrene (PS), a polyimide (PI), or another suitable polymer or plastic or combination thereof), or any other suitable housing material or combination of materials.

As mentioned above, the dimensions (e.g., length and width) of the base (e.g., the bottom portion 74) of the battery module 28 may be selected to be similar to or exactly the same as that of a particular type of lead-acid battery (e.g., a particular battery group). The battery module 28 may include any number of battery cells, depending on the voltage and/or capacity requirements of the battery module 28, as well as the individual voltage and capacity of each battery cell and the manner in which they are coupled. Accordingly, any number and/or arrangement of battery cells may be used depending on the desired power of the battery module 28 and/or the desired dimensions (e.g., length, width, and/or height) of the battery module 28. It should be appreciated with reference to the illustrated embodiment that no actuating clamping features are used on the battery module 28. Rather, the battery cells remain in a compressed assembly by way of internal housing and compression features that are not actuatable within the housing, as discussed below.

In this regard, the housing 62 of the battery module 28 may be configured such that a group of battery cells may be arranged within the housing 62 as a compressed assembly to provide a desired power output, regardless of the degree of variance in dimensions of individual battery cells, as long as each are within the manufacturing tolerance of the individual battery cells. As an example, at least one dimension of the housing 62 may be selected to allow placement of a desired number of battery cells even if all of the battery cells have dimensions on a larger side of a manufacturing tolerance range. Further, the at least one dimension of the housing 62 may be selected to place or maintain a desired compression force on the group of battery cells, even if all of the battery cells have dimensions on a smaller side of the manufacturing tolerance range. In this situation, the battery module 28 may include various internal features that ensure this force is provided.

Figure 4:
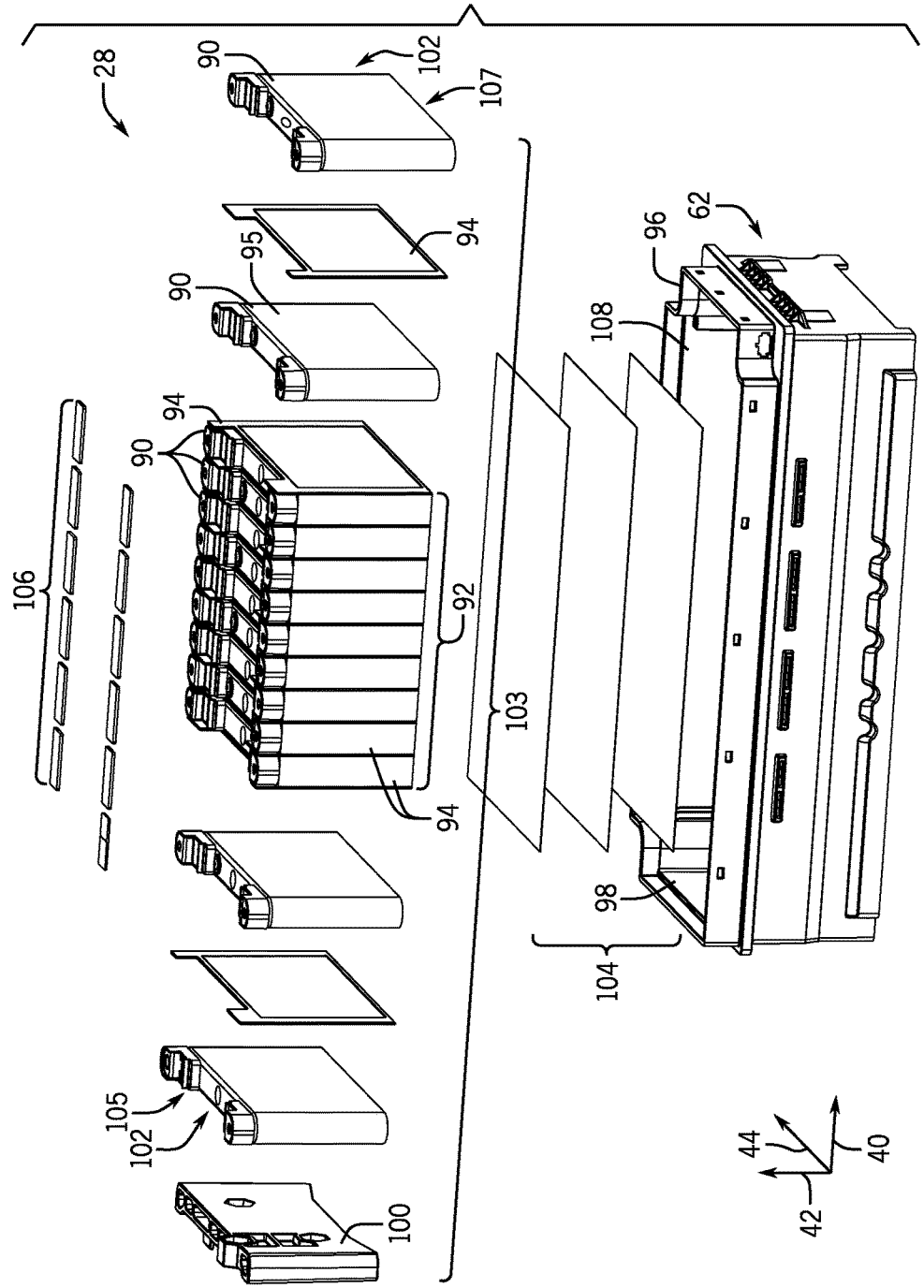
FIG. 4 is an exploded perspective view of an embodiment of the battery module of FIG. 3, illustrating an arrangement of features used to form a compressed cell assembly, in accordance with an embodiment of the present approach.

For example, FIG. 4 illustrates an exploded perspective view of an embodiment of the battery module 28 including the housing 62 that is sized to facilitate placement of a plurality of battery cells 90 in a desired manner (e.g., as a compressed assembly). While any single type of battery cell 90 may be utilized, the battery cells 90 used in the battery module 28 may all have the same general shape (e.g., prismatic, cylindrical, pouch, or any other), the same electrochemistry (e.g., electrode active materials, electrolytes, additives), the same general dimensions (e.g., to within manufacturing tolerances), and other similar design features (e.g., electrical isolation). In the depicted embodiment, the battery module 28 includes a number of battery cells 90 sufficient to enable the battery module 28 to provide a 48 V output, though the battery module 28 may output other voltages (e.g., 12 V) using different numbers and/or connections of battery cells 90.

The battery cells 90, before introduction into the module housing 62, may be arranged in a cell stack 92. In certain embodiments, a spacer 94 (e.g., one or more) may be used between each battery cell 90 of the cell stack 92 to separate the battery cells 90 from one another. The spacers 94 may be in any suitable form, such as discrete layers (e.g., plastic or silicone dividers) that are separate from the battery cells 90; adhesive strips, tabs, or the like that are adhered to the battery cells 90; rubber bands wrapped around the individual battery cells 90; or adhesive foam tape secured to the battery cells 90. In embodiments where the spacers 94 are adhesive, the battery cells 90 may be adhered to one another.

In some embodiments, the spacers 94 may provide a sufficient degree of electrical insulation to prevent cell-to-cell conductance (e.g., due to cell swelling or movement). For example, in embodiments where a casing 95 of the battery cells 90 is charged (e.g., used as a terminal), one of the spacers 94 may cover an entire conductive surface of a battery cell 90 (e.g., the portions of the prismatic battery cells 90 that may contact an adjacent battery cell 90). However, in other embodiments where the casings 95 are not charged, the spacers 94 (e.g., adhesive strips, adhesive tabs, rubber bands, etc.) may only cover a portion of the conductive surfaces of the battery cells 90. In such embodiments, the spacers 94 may not necessarily provide electrical insulation. In these situations, an insulating material (e.g., an additional type of spacer) may be disposed around the conductive surfaces of the battery cells 90.

By way of non-limiting example, the insulating material may be a polymeric coating, which may electrically insulate the battery cells 90 and may protect the battery cells 90 from certain environmental (e.g., air, moisture, debris, etc.) conditions. The polymeric coating may be a dielectric capable of insulating the battery cells 90 from one another and also from other electrically conductive contacts (e.g., in portions of the battery cell 90 where such insulation is desirable). The polymeric coating may be sprayed on the battery cell 90, or the battery cell 90 may be dipped in the polymeric coating. The polymeric coating may be a monomer or a cross-linkable resin that is either liquid in form, gelatinous, or in solution with a solvent that can be removed (e.g., by evaporation). The monomer or cross-linkable resin may then be subjected to an appropriate stimulus to affect some degree of hardening of the polymeric coating to set the polymeric coating on the battery cell 90.

The cell stack 92 of battery cells 90 and spacers 94 (where utilized) may be inserted into an opening 96 of the housing 62. In certain embodiments, housing 62 may be sized to a maximum allowable tolerance for a desired number of battery cells 90 (e.g., to provide a desired power output for the battery module 28). That is, the housing 62 may be large enough to accommodate the desired number of battery cells 90 and other components (e.g., spacers 94), even if all of the battery cells 90 are on the larger end of a manufacturing tolerance. This may be desirable because the cell stack 92 may be assembled, compressed, and inserted into the housing 62 without first determining the degree of variance within the manufacturing tolerance of the individual battery cells 90. This may increase the speed and efficiency of manufacturing the battery module 28.

In embodiments in which the battery cells 90 are all on the larger end of the manufacturing tolerance, the cell stack 92 of the battery cells 90 and spacers 94 may fit tightly within the housing 62, which may maintain a sufficient amount of compression force on the battery cells 90. For instance, the cell stack 92 may be compressed (e.g., using an external actuating clamping mechanism that is not attached to or an integral feature of the battery module 28) before the cell stack 92 is inserted into the housing 62. After the cell stack 92 is inserted into the housing 62, the external clamping mechanism may be removed and the housing 62 may itself maintain a desired compression on the battery cells 90 (e.g., may provide a compression force on the cell stack 92 that is above a predetermined threshold). That is, the housing 62 may reduce or block expansion of the battery cells 90 past a predetermined threshold. Thus, by compressing the cell stack 92 prior to inserting the cell stack 92 into the housing 62, the housing 62 may be used to maintain a sufficient compression force on the battery cells 90 without using actuating clamping mechanisms that remain with the battery module 28 (e.g., internal and/or external to the housing 62). In situations where the battery cells 90 are appropriately sized (e.g., based on the desired compression force and size of the cell stack 92), no additional internal compression maintenance may be used.

However, in some embodiments, the housing 62 may be sized such that a gap is present between an interior surface 98 of the housing 62 and the cell stack 92 after the cell stack 92 is inserted. For example, this may occur in embodiments in which one or more of the battery cells 90 of the cell stack 92 are on the smaller end of the manufacturing tolerance. To fill the gap and to maintain a sufficient compression force on the cell stack 92, one or more retaining walls 100 (e.g., removable retaining walls) may be provided at ends 102 (e.g., a first end 105 and a second end 107 opposite the first end 105) of the cell stack 92 to generate a compressed cell assembly 103. For example, the retaining walls 100 may be generally rectangular prisms (e.g., blocks, plates) formed of any suitable material or combination of materials, such as polymers having different degrees of hardness and/or strength, relatively compressible materials such as silicone, breakable and rigid materials such as glass, or composite materials such as glass-filed polypropylene. The retaining walls 100 may be used to compress the cell stack 92 after the cell stack is inserted into the housing 62, or the cell stack 92 and/or the retaining walls 100 may be compressed together (e.g., as the compressed cell assembly 103) prior to insertion into the housing 62. For example, the compressed cell assembly 103 may be disposed in a portion 108 of the housing defining an interior space of the housing 62, and the portion 108 may surround the compressed cell assembly 103 on three sides. In addition, the retaining walls 100 may not necessarily be the same size, shape, or material, depending on their location within the battery module 28. Further, the present disclosure also encompasses embodiments where one or more actuating clamping mechanisms external or internal to the housing 62 may be used in addition to the retaining walls 100 to provide additional compression force on the battery cells 90. As shown, the battery module 28 may also include additional structures, such as one or more thermal gap pads 104, bus bars 106 configured to electrically couple to the battery cells 90, or any other suitable components. As discussed below, certain components of the battery module 28 may be located on one or more of the retaining walls 100.

Figure 6:
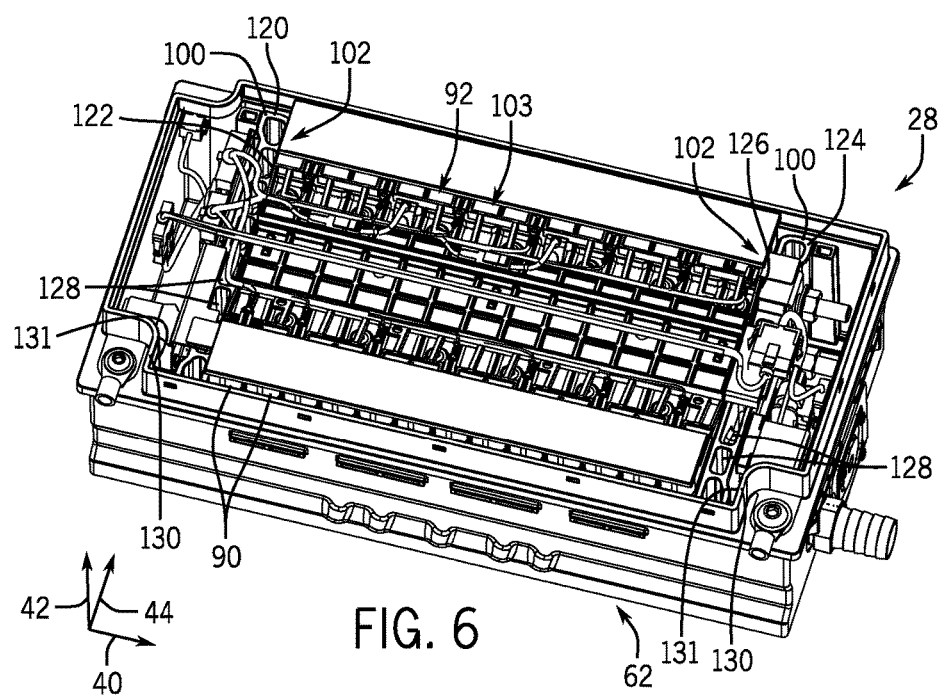
FIG. 6 is a front top perspective view of the battery module of FIG. 3 with a top cover removed and having a compressed cell assembly with two retaining walls, in accordance with an embodiment of the present approach.
Figure 7:
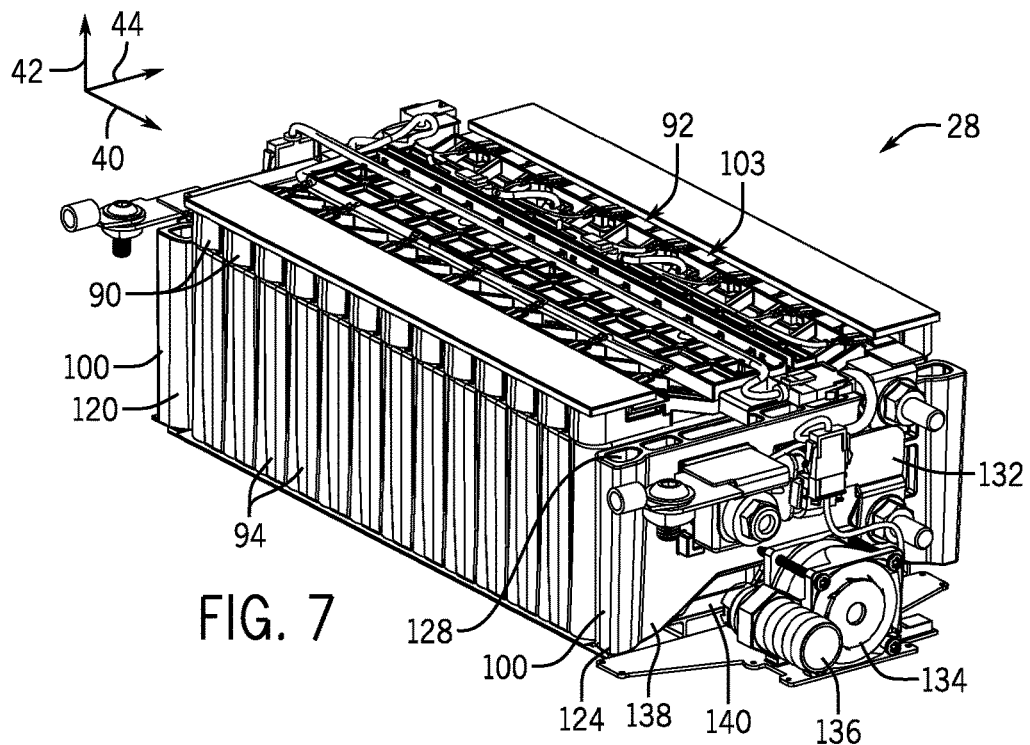
FIG. 7 is a right side perspective view of the battery module of FIG. 3 with a housing removed and having a relay disposed on one of the retaining walls, in accordance with an embodiment of the present approach.
Figure 8:
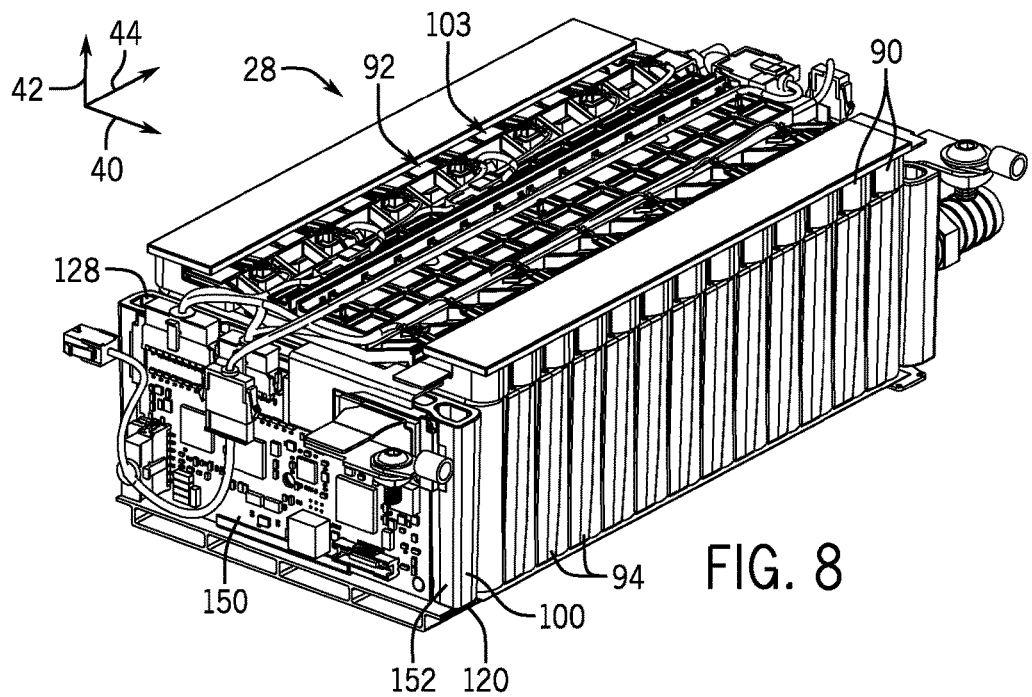
FIG. 8 is a left side perspective view of the battery module of FIG. 3 with the housing removed and having electronics disposed on another of the retaining walls, in accordance with an embodiment of the present approach.
Figure 9:
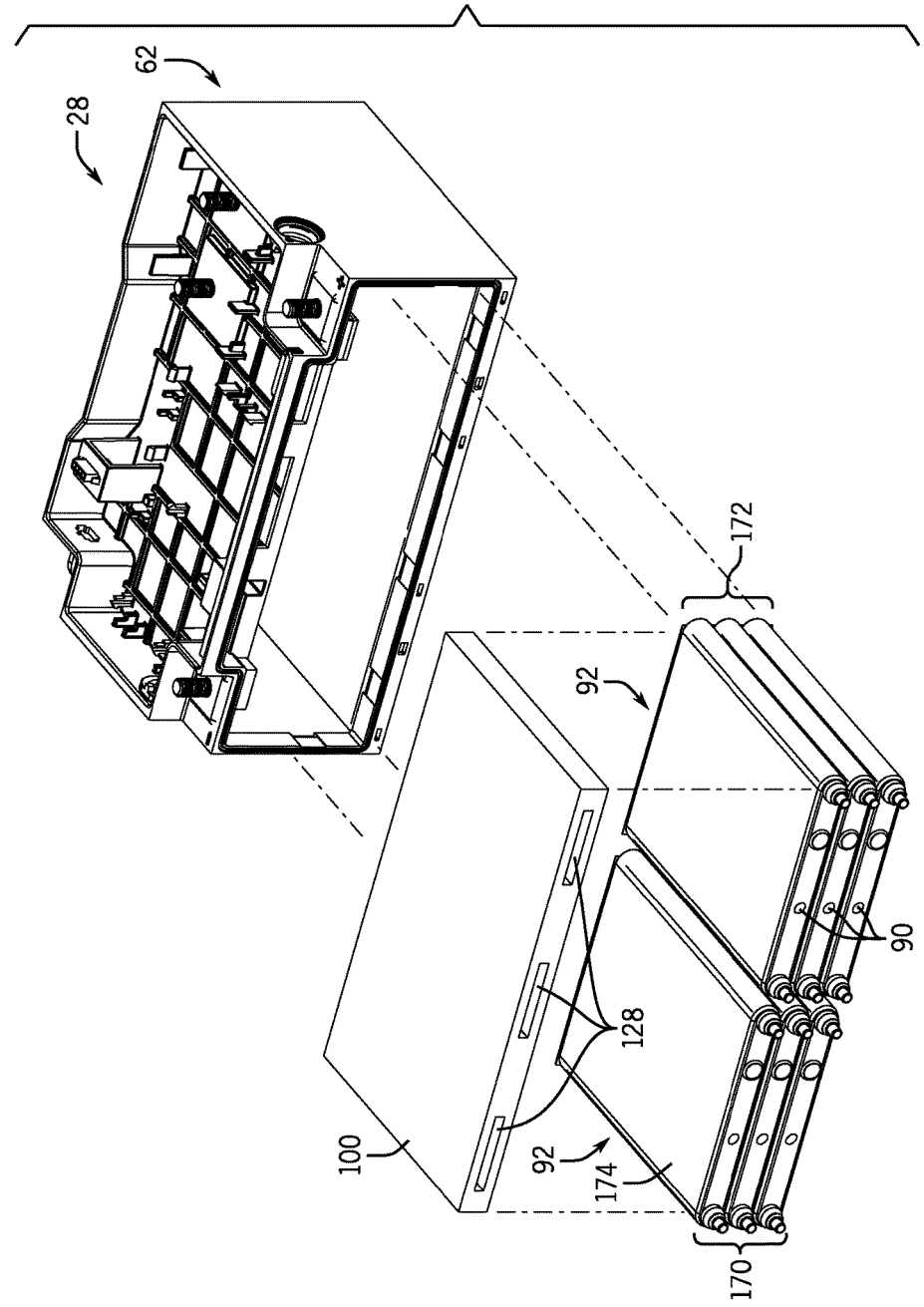
FIG. 9 is an exploded perspective view of an embodiment of the battery module of FIG. 3 including a single retaining wall used for compression of multiple stacks of battery cells, in accordance with an embodiment of the present approach.

In the illustrated embodiment, the cell stack 92 is oriented along the z-axis 40 (e.g., in a row arrangement). However, it should be noted that the battery cells 90 may be positioned in any suitable arrangement. For example, while a single cell stack 92 may be utilized, in other embodiments, the battery cells 90 may be arranged in one or more cells stacks 92. Further, the one or more cell stacks 92 may be oriented vertically (e.g., in a columnar arrangement) or horizontally (e.g., in a row arrangement). For example, as illustrated in FIGS. 6-8, the battery module 28 may include a single cell stack 92, which may include any suitable number of battery cells 90 and may be oriented horizontally. In other embodiments, as illustrated in FIG. 9, the battery module 28 may include two cell stacks 92 oriented vertically (e.g., in a columnar arrangement), where each cell stack 92 may have half of the total number of battery cells 90 in the battery module 28 and provide the same functionality (e.g., a 48V or other output).

Figure 5:
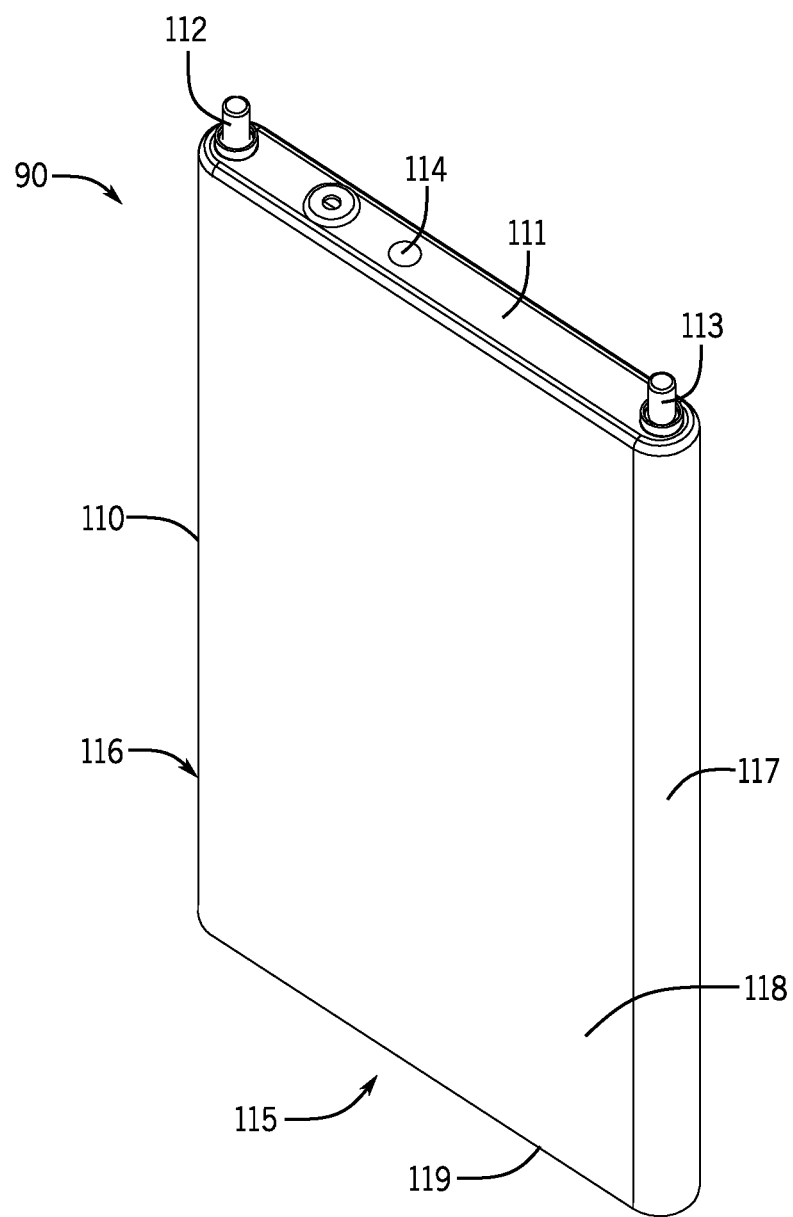
FIG. 5 is a perspective view of an embodiment of a prismatic battery cell that may be a part of the compressed cell assembly of FIG. 4, in accordance with an embodiment of the present approach.

The battery cells 90 described herein may be prismatic battery cells, where a prismatic battery cell, as defined herein, includes a prismatic case that is generally rectangular in shape. In contrast to pouch cells, the prismatic casing is formed from a relatively inflexible, hard (e.g., metallic) material. However, it should be noted that certain embodiments described below may incorporate pouch cells in addition to or in lieu of prismatic battery cells. In accordance with present embodiments, each prismatic battery cell may include a prismatic cell casing 110, as illustrated in FIG. 5. The prismatic cell casing 110 may include a top casing portion 111, where a set of cell terminals 112 and 113 (e.g., positive and negative cell terminals) are located. One or more cell vents 114 may also be located on the top casing portion 111. The prismatic cell casing 110 also includes a bottom casing portion 115 positioned opposite the top casing portion 111. First and second sides 116 and 117, which may be straight or rounded, extend between the top and bottom casing portions 111 and 115 in respective positions corresponding to the cell terminals 112 and 113. First and second faces 118 and 119, which may be flat (as shown) or rounded, couple the first and second sides 116 and 117 at opposing ends of each cell 90.

As illustrated in FIG. 6, which illustrates the battery module 28 of FIG. 3 with the top portion 72 (e.g., top cover 73) removed, the battery module 28 includes two retaining walls 100 (e.g., blocks, plates) disposed against ends 102 of the cell stack 92. In particular, the two retaining walls 100 include a first retaining wall 120 disposed against a first end 122 of the cell stack 92 and a second retaining wall 124 disposed against a second end 126 of the cell stack 92. As illustrated, the first and second retaining walls 120 and 122 may be generally rectangular in shape. For example, the first and second retaining walls 120 and 122 may include substantially rectangular and planar faces that abut the first and second ends 122 and 126 of the cell stack 92. In certain embodiments, the retaining walls 100 may be prismatic in shape, similar to the battery cells 90 used in the battery module 28. In certain embodiments, the retaining walls 100 are not integrated into or coupled to the housing 62.

The first and second retaining walls 120 and 124 may each include one or more slots 128, which may be configured to receive a corresponding portion of a clamping and positioning mechanism to compress the cell stack 92 and insert the compressed cell stack 92 into the housing 62. For example, the one or more slots 128 may be configured to be engaged by a clamping mechanism for engagement and compression of the compressed cell assembly 103 prior to insertion into the housing 62. The clamping and positioning mechanism may be an actuating mechanism (e.g., a clamp) that is external to the battery module 28 and is removed from (e.g., is not attached to) the battery module 28 after the cell stack 92 is compressed and inserted into the housing 62. Thus, the clamping and positioning mechanism is not an actuating clamping mechanism as in traditional systems because it is not coupled to or integrated with the battery module 28. For example, it does not remain with the battery module 28 after manufacture. The first and second retaining walls 120 and 124 also contact retaining tabs 130 of the housing 62 having interior surfaces 131 that are spaced apart by a fixed distance. The retaining tabs 130 may create internal space within the housing 62 for other components (e.g., electronics, switches, conductors) of the battery module 28. Additionally, the retaining tabs 130 are protrusions in the housing 62 that include interior surfaces 131 that abut the removable walls 120 and 124 to maintain the compressed state of the cell stack 92. In some embodiments, the interior surfaces 131 of the retaining tabs 130 may contact only a portion of the removable walls 120 and 124. As such, after the cell stack 92 (e.g., as part of the compressed cell assembly 103) is inserted into the housing 62, the first and second retaining walls 120 and 124 and the retaining tabs 130 of the housing 62 may provide a retaining and compression force on the battery cells 90 of the cell stack 92 such that the battery cells 90 may only decompress (e.g., expand) toward an uncompressed state by a predetermined amount. As such, the first and second retaining walls 120 and 124 and the retaining tabs 130 (e.g., the interior surfaces 131 of the retaining tabs 130) may cooperate to maintain compression of the cell stack 92. Further, the interior surfaces 131 of the retaining tabs 130 are configured to maintain the compressed cell assembly 103 in a compressed state having a compression force above a predetermined threshold. In certain embodiments, the first and second retaining walls 120 and 124 and the retaining tabs 130 of the housing 62 may provide a retaining and compressing force on the battery cells 90 such that the battery cells 90 do not decompress from the compressed state. The retaining tabs 130 may also be used to maintain placement of one or more components of the housing 62 (e.g., in embodiments in which the housing 62 includes one or more separable portions). That is, a restorative force provided by the compressed cell assembly 103 against the housing 62 may also be used as a force that maintains the relative position of two or more housing portions that would otherwise not couple together.

In other embodiments, the battery module 28 may include only a single retaining wall 100, which may be disposed against the first end 122 or the second end 126 of the cell stack 92. Providing only a single retaining wall 100 may be desirable to decrease the dimensions of the housing 62 and/or decrease manufacturing costs. The ability to use one or two retaining walls also increases the dimensional flexibility of the housing 62. In such embodiments, a clamping mechanism (e.g., that is not attached to the battery module 28 after the cell stack 92 is compressed and inserted into the housing 62) may engage the one or more slots 128 of the single retaining wall 100 and may compress the cell stack 92 between the single retaining wall 100 and a side of the cell stack 92 opposite the retaining wall 100, or between the single retaining wall 100 and the housing 62 (e.g., one of the retaining tabs 130 of the housing 62).

Again, the removable walls 100 may be constructed of any suitable material, for example a plastic, composite, ceramics, silicone, glass, or glass-filled polypropylene. Indeed, it is presently recognized that constructing the retaining walls 100 from certain materials provides advantages that have been heretofore unrecognized. For example, constructing the retaining walls 100 out of glass may facilitate the recycling of the battery module 28 by enabling their removal from the battery module 28 without using complex equipment. Further, constructing the spacers 100 out of glass or glass-filled polypropylene may be desirable to provide a force-absorbing feature should the battery cells 90 rupture and vent. The retaining walls 100 may, additionally or alternatively, include an intentional weak point or a crumple zone, which may provide similar force distribution.

For example, a battery cell 90 of the cell stack 92 may expand and rupture due to an internal overpressure or over-temperature of the battery cell 90. Thermal runaway may also propagate to adjacent battery cells 90. To accommodate a resulting increase in the internal pressure of the battery module 28 itself, the retaining wall 100, an intentional weak point or a crumple zone of the retaining wall 100, or a similar feature, may be configured to break or crumple, which may consume some of the energy from the expanding or rupturing battery cell 90 and may enable the expanding or rupturing battery cell 90 to expand into additional space in the housing 62. Present embodiments may provide a more efficient manner for accommodating such scenarios.

The vent gases caused by cell venting may be somewhat corrosive or otherwise deleterious to other components (e.g., the battery cells 90, electronics). The retaining walls 100 may incorporate a material configured to mitigate certain undesirable chemical properties of the vent gas. For example, additional materials (e.g., absorptive, neutralizing) may be incorporated into the retaining walls 100.

In addition, or as an alternative, to using the retaining walls 100 in the manner set forth above, the retaining walls 100 may be utilized as a mount for one or more components of the battery module 28. For example, as illustrated in FIG. 7, the second removable wall 124 may be utilized as a mount for a relay 132 of the battery module 28. A fan 134, portions of a vent 136, and/or any other suitable components or electronics may be similarly mounted on the second retaining wall 124. As such, the second retaining wall 124 separates the battery cells 90 from the relay 132 and may block vented gases from the relay 132 and also block some heat transfer during normal operation. The second retaining wall 124 may be any suitable shape and material construction to facilitate the coupling of components of the battery module 28 to the second retaining wall 124. For example, in some embodiments, the second retaining wall 124 may include a flat side surface 138 that may be used as a mount for the desired components and a recess 140 shaped to accommodate the vent 136 and/or other features.

Similarly, the retaining walls 100 may be utilized to mount both simple and complex circuitry (e.g., electronics such as a battery control module) of the battery module 28. For example, as illustrated in FIG. 8, the first retaining wall 120 may be used as a mount for a circuit board (e.g., control board) 150 of the battery module 28. Similar to the second retaining wall 124, the first retaining wall 120 may include any suitable shape to facilitate the coupling of the circuit board 150 of the battery module 28 to the first retaining wall 120. For example, in some embodiments, the first retaining wall 120 may include a flat side surface 152 that may be used as a mount for the circuit board 150 and/or any other desired components of the battery module 28. In addition to providing a structural mount for the circuit board 150, the first retaining wall 120 may also thermally and electrically isolate the battery cells 90 from the circuit board 150 and vice versa, which may reduce noise (e.g., interference). Further, utilizing the first retaining wall 120 and/or the second retaining wall 124 as mounts allows subassembly of the desired components onto first retaining wall 120 and/or the second retaining wall 124 prior to inserting the first retaining wall 120 and/or the second retaining wall 124 into the housing 62, which may decrease manufacturing times and costs. In other words, the retaining walls 120 and 124 shown in FIGS. 7 and 8 having their mounted components could be introduced in assembled form into the battery module 28, which would greatly decrease manufacturing complexity and time.

As noted above, the battery module 28 may, in some embodiments, include only a single retaining wall 100. In such embodiments, the retaining wall 100 may be used to mount several desired components of the battery module 28, such as the circuit board 150, the relay 132, the fan 134, and/or the vent 136. As an example, it may be desirable to utilize a single retaining wall 100 to reduce the size of the housing 62 and/or to reduce manufacturing costs. Indeed, for battery modules 28 where the footprint of the battery module 28 is of concern, such mounting may afford a degree of flexibility that eases manufacturing considerations.

The orientation of the retaining walls 100 is not limited to the orientations shown in FIGS. 6-8. Rather, the present disclosure also includes alternative orientations, as shown in FIG. 9. Further, a single retaining wall 100 may be used to retain multiple cell stacks 92. For example, as illustrated in FIG. 9, the battery cells 90 may be arranged into two (or more) cell stacks 92. In the illustrated embodiment, the two cell stacks 92 include a first columnar cell stack 170 and a second columnar cell stack 172. However, in other embodiments, more than two cell stacks 92 may be utilized and/or the cell stacks 92 may be positioned horizontally (e.g., in a row arrangement).

A retaining wall 100 may be disposed on a top surface 174 of the first and second columnar cell stacks 170 and 172. In some embodiments, the retaining wall 100 may include the one or more slots 128 configured to be engaged by a clamping mechanism, as discussed above. The first and second columnar cell stacks 170 and 172 may be compressed using the retaining wall 100 and inserted into the housing 62 of the battery module 28. In particular, a first portion of a clamping mechanism may abut the top surface 174 of the first and second columnar cell stacks 170 and 172 and a second portion of the clamping mechanism may be inserted into the one or more slots 128 of the retaining wall 100. The clamping mechanism may apply a compressive force against the top surface 174 of the first and second columnar cell stacks 170 and 172 and the retaining wall 100. The retaining wall 100 may be retained in place by the top portion 72 of the housing 62. However, in other embodiments, the first and second columnar cell stacks 170 and 172 may be compressed using two retaining walls 100 disposed about the top surface 174 and a bottom surface 176 of the first and second columnar cells stacks 170 and 172, respectively.

Figure 10:
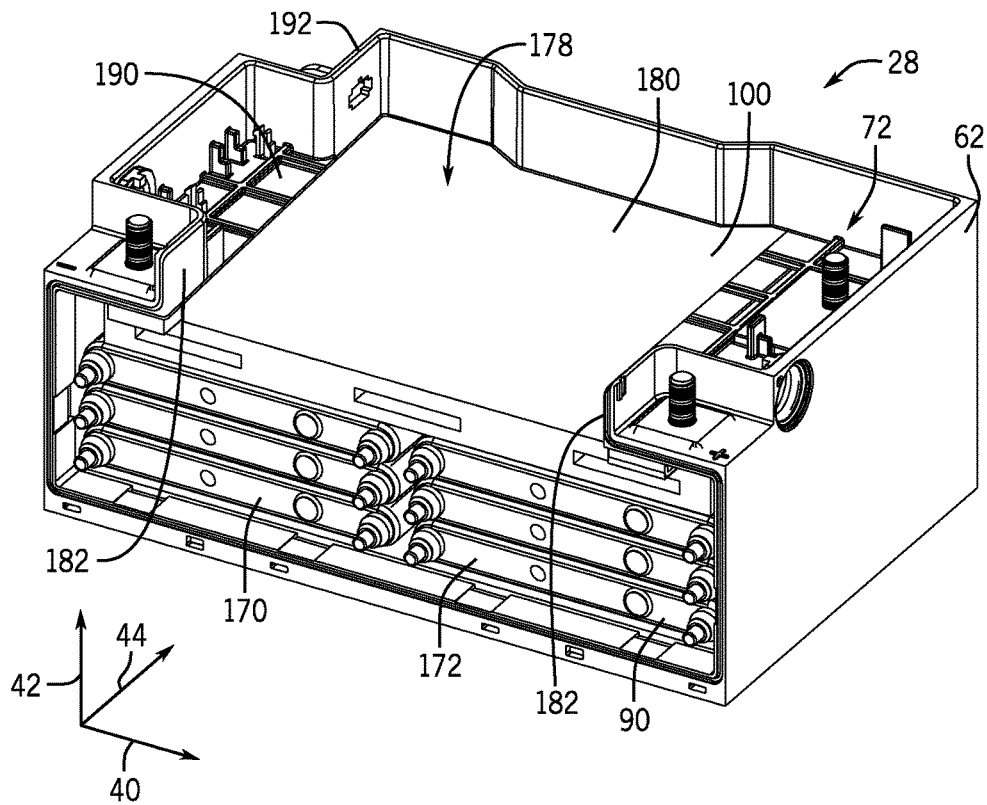
FIG. 10 is a perspective view of an embodiment of the battery module of FIG. 9 and having a retaining wall, where electronics of the battery module are on the retaining wall and protrude through a partial opening of the housing, in accordance with an embodiment of the present approach.

Additionally, in some embodiments, the retaining wall 100 may function as a portion of the housing 62 of the battery module 28. For example, as illustrated in FIG. 10, a center region 178 of the top portion 72 of the housing 62 is removed. The first and second columnar cell stacks 170 and 172 may be compressed and inserted into the housing 62 using the retaining wall 100 as discussed above. However, in FIG. 10, a top surface 180 of the retaining wall 100 may be exposed and may function as the removed center region 178 of the top portion 72 of the housing 62. In such embodiments, the retaining wall 100 may be retained within the housing via retaining tabs 182 of the housing 62.

Again, in a similar manner as set forth above with respect to the retaining walls 120, 124 of FIGS. 6-8, the removable wall 100 of FIGS. 9 and 10 may have various conductors, switches (e.g., relays), and electronics (e.g., battery control module, sensors, a printed circuit board) mounted to it. In the illustrated embodiment of FIG. 10, the battery module 28 includes a substantially isolated region 190 formed by the top portion 72 of the housing 62 (functioning as the tabs 182), the removable wall 100, peripheral walls 192 of the top portion 72, and a removable top cover (not shown) that fits over the peripheral walls 192 (e.g., similar to top cover 73 of FIG. 3). The substantially isolated region may isolate the electronics, switches, circuits, and so forth (e.g., electrical components) mounted to the removable wall 100 from a region of the battery module 28 housing the battery cells 90, as well as from the external environment.

Figure 11:
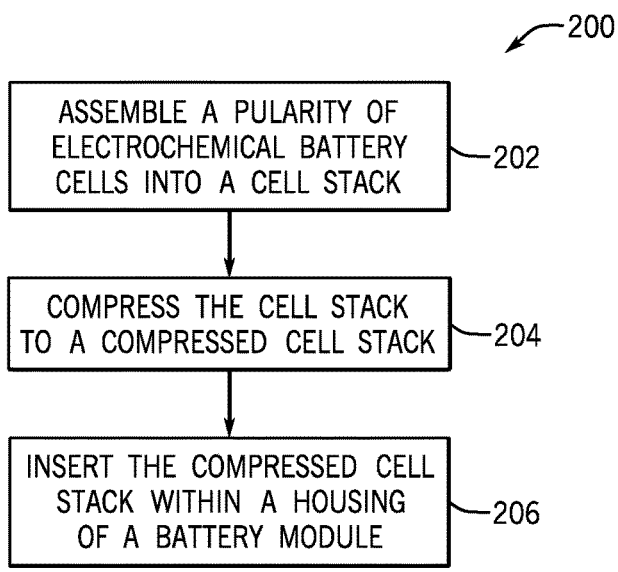
FIG. 11 is a flow diagram illustrating an embodiment of a method for manufacturing a battery module having a compressed cell assembly, in accordance with an embodiment of the present approach.

FIG. 11 illustrates an embodiment of a method 200 for manufacturing the battery modules 28 of the present approach. In particular, the method 200 includes assembling a plurality of battery cells (e.g., the battery cells 90) into a cell stack (e.g., the cell stack 92) (block 202). In certain embodiments, assembling the plurality of battery cells into the cell stack may include providing a cell spacer (e.g., spacer 94) between each battery cell of the plurality of battery cells. As described in detail above, the spacers 94 may electrically insulate the battery cells from one another.

Further, the method 200 includes compressing the cell stack into a compressed cell stack (block 204). Compressing the cell stack into the compressed cell stack may utilize one or more retaining walls 100, as discussed in detail above, that may be configured to be engaged by a clamping mechanism. In some embodiments, the cell stack 92 may be compressed between two retaining walls 100 using the clamping mechanism. For example, the clamping mechanism may include a first clamp configured to engage with a first retaining wall 100 (e.g., via the one or more slots 128) and a second clamp configured to engage with a second retaining wall 100 (e.g., via the one or more slots 128). In other embodiments, the cell stack 92 may be compressed between a retaining wall 100 disposed about a first end of the cell stack 92 and a surface of one of the battery cells 90 disposed at a second end of the cell stack 92. In such embodiments, the clamping mechanism may include a first clamp configured to engage the retaining wall 100 (e.g., via the one or more slots) and a second clamp configured to engage with the surface of the battery cell 90 disposed at the second end of the cell stack 92. Alternatively, the cell stack 92 may be compressed between a retaining wall 100 disposed about a first end of the cell stack 92 and an interior surface of the housing 62 disposed about a second (e.g., opposite) end of the cell stack 92. In such embodiments, the clamping mechanism may include a first clamp configured to engage with the retaining wall 100 (e.g., via the one or more slots 128) and a second clamp configured to engage with the housing 62 (e.g., an exterior surface of the housing 62). An example embodiment of this arrangement is shown in FIG. 12.

Once the compressed cell stack is formed, the compressed cell stack 92 is inserted into the housing 62 of the battery module 28 (block 206). As discussed in detail above, the one or more retaining walls 100 in combination with the housing 62 may provide a sufficient retention and compression force on the compressed cell stack to retain the compressed cell stack in a desired position and to reduce or prevent expansion of the battery cells during operation of the battery module 28. Further, as noted above, the clamping mechanism may be external to the battery module 28 and may be removed from the battery module (e.g., may not be attached to the battery module 28) after the cell stack 92 is compressed and inserted into the housing 62.

FIG. 12 illustrates a partial schematic view of a system 230 that may be configured to implement the method 200 to manufacture the disclosed battery modules 28. As illustrated, the cell assembly 103 may be assembled using the battery cells 90, the spacers 94, and one or more retaining walls 100. As described above, the retaining walls 100 include the one or more slots 128. A clamping and positioning system 232 may be configured to engage the one or more slots 128 of the one or more retaining walls 100 and/or a surface of a battery cell 90 on an end 102 of the cell stack 92 (e.g., for embodiments in which only one removable wall 100 is used). The clamping and positioning system 232 may be configured to compress the cell assembly 103 and to insert the compressed cell assembly 103 within the housing 62 of the battery module 28.

FIG. 13 illustrates a schematic view of the battery module 28 including two retaining walls 100 (e.g., the first and second retaining walls 120 and 124). As illustrated, the battery cells 90 (and, in some embodiments, the cell spacers 94) are arranged into the cell stack 92. As described in detail above, the first and second retaining walls 120 and 124 (and one or more additional retaining walls 100, when needed) may be disposed adjacent to the ends 102 of the cell stack 92 and compressed to form the compressed cell assembly 103, and the compressed cell assembly 103 may be inserted into the housing 62. In addition, one or more additional retaining walls 100 and/or spacers 94 may be provided if a gap is present between one or more ends 250 of the compressed cell assembly 103 and the retaining tabs 130 of the housing 62 (e.g., if a length 252 of the cell assembly 103 including the first and second retaining walls 120 and 124 is less than a distance 254 between the retaining tabs 130 at opposing ends of the housing 62).

As illustrated, a gap 256 is present between the first retaining wall 120 and the end portion 64 of the housing 62. Similarly, a gap 258 is present between the second retaining wall 124 and the end portion 66 of the housing 62. The restorative force resulting from internal pressures (e.g., internal battery cell pressures) of the compressed cell assembly 103 may cause the compressed cell assembly 103 to expand (e.g., decompress) in outward directions 260 (e.g., along the Z axis 40) against the housing 62 (e.g., against retaining tabs 130). The retaining tabs 130 maintain the position of the first and second retaining walls 120 and 124 (and any additional retaining walls 100) such that the first and second retaining walls 120 and 124 do not move past the retaining tabs 130 and into the gaps 256 and 258, respectively. By maintaining the position of the first and second retaining walls 120 and 234, the compressed cell assembly 103 remains in a compressed state with a compression force above a predetermined threshold. The predetermined threshold may be based on, for example, a correlation between cell volume, expansion, or swell percentage, and state of charge (SOC) for the particular type of battery cells utilized.

As noted above, a battery cell 90 of the cell stack 92 may expand and rupture due to an internal overpressure or over-temperature of the battery cell 90. To accommodate a resulting increase in the internal pressure of the battery module 28 itself, the first and second retaining walls 120 and 124, an intentional weak point or a crumple zone of the first and second retaining walls 120 and 124, or a similar feature, may be configured to break or crumple. This may consume some of the energy from the expanding or rupturing battery cell 90. For example, if the first retaining walls 120 breaks or crumples, portions of the first retaining wall 120 may fall into the gap 256, which may create space between the end of the cell stack 92 and the retaining tabs 130. This additional space may allow the battery cells 90 to expand and/or separate, which may reduce impact on other components of the batter module 28. Additionally, the battery cells 90 may expand or swell into the gap 256. Further, if the first retaining wall 120 breaks or crumples, at least a portion of the gap 256 may be exposed to the battery cells 90, and the vented gases may spread to the gap 256, which may reduce the exposure of the adjacent battery cells 90 to the vented gases.

In certain embodiments, one or more retaining walls 100 may function as an end portion (e.g., the end portions 64 or 66, the side portions 68 or 70, the top portion 72, or the bottom portion 74) of the housing 62. For example, as illustrated in FIG. 14, the housing 62 does not include the end portion 66. That is, the housing 62 may be constructed using the end portion 64, the side portions 68 and 70, the top portion 72, the bottom portion 74, and the retaining tabs 130, and the housing 62 may not include the end portion 66. Instead, a retaining wall 100 (e.g., the second retaining wall 124) may be used as the end portion 66. Thus, an end 250 of the compressed cell assembly 103 (e.g., an exterior surface 270 of the second retaining wall 124) may be an exterior surface of the housing 62. As described above, the position of the second retaining wall 124 is maintained by the retaining tabs 130 and the restorative force of the compressed cell assembly 103 expanding from a more compressed stage. As such, the retaining tabs 130 maintain the compressed state of the compressed cell assembly 130 and enable the second retaining wall 124 to be used as an end portion of the housing 62.

One or more of the disclosed embodiments, alone or on combination, may provide one or more technical effects including the manufacture of battery modules having compressed battery cells (e.g., prismatic battery cells). The disclosed designs enable the use of stacks of battery cells that may be placed within a housing of the battery module and that may be compressed and/or restrained within the housing of the battery module using one or more spacers. The disclosed battery module designs enable greater variability in the dimensions of each battery cell of a battery module, providing greater flexibility to select a set of battery cells for installation in a battery module based on particular electrical and thermal considerations, without having to worry about the exact dimensions of each battery cell relative to the battery module housing. Additionally, the disclosed spacers may reduce or prevent swelling of the battery cells of the battery module during operation, thus improving performance of the battery cells over the lifetime of the battery module. Further, the spacers may provide thermal runaway protection. Additionally, the spacers may function as a structural mount for components of the battery module, such as the relay and the circuit board, and may electrically and thermally isolate the battery cells from the circuit board. Accordingly, the disclosed battery module designs offer improved flexibility and performance compared to other battery module designs. Additionally, the disclosed battery module designs may reduce weight and bulk of the battery modules, because no actuating clamping mechanisms are incorporated into (e.g., attached to, integrated into, disposed within) the battery module. The technical effects and technical problems in the specification are exemplary and are not limiting. It should be noted that the embodiments described in the specification may have other technical effects and can solve other technical problems.

While only certain features and embodiments have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A battery module, comprising:
a housing comprising a first interior surface and a second interior surface opposite the first interior surface; and
a compressed cell assembly disposed within an interior space of the housing between the first and second interior surfaces, comprising:
a plurality of prismatic battery cells arranged in a cell stack comprising a first end and a second end disposed opposite the first end, wherein each of the plurality of prismatic battery cells has a substantially inflexible metallic packaging; and
a first retaining wall disposed between the first end of the cell stack and the first interior surface of the housing, wherein the first retaining wall comprises a respective first surface in contact with the first end of the cell stack and a respective second surface opposite the first surface that contacts the first interior surface of the housing; and
a second retaining wall disposed between the second end of the cell stack and the second interior surface of the housing, wherein the second retaining wall comprises a respective first surface in contact with the second end of the cell stack and a respective second surface opposite the first that contacts the second interior surface of the housing, and wherein the first and second interior surfaces are configured to maintain the compressed cell assembly in a compressed state having a compression force above a predetermined threshold, wherein the battery module does not include an actuating clamping mechanism, wherein the first interior surface of the housing comprises protrusions in contact with only a portion of the respective second surface of the first retaining wall, and wherein the battery module comprises a circuit board mounted to the respective second surface of the first retaining wall in a region not in contact with the first interior surface of the housing.

2. The battery module of claim 1, wherein the first and second retaining walls comprise one or more respective slots configured to temporarily engage an external actuating clamping mechanism to compress the compressed cell assembly prior to insertion into the housing.

3. The battery module of claim 1, wherein the first retaining wall electrically and thermally insulates the plurality of prismatic battery cells from the circuit board.

4. The battery module of claim 1, wherein the battery module comprises a relay configured to couple the battery module to a load, and wherein the relay is coupled to the respective second surface of the first retaining wall.

5. The battery module of claim 1, wherein the first and second retaining walls are constructed from glass.

6. The battery module of claim 1, wherein the first and second retaining walls are constructed from glass-filed polymer.

7. The battery module of claim 1, wherein the first and second retaining walls comprise a respective crumple zone configured to break due to expansion of a prismatic battery cell of the plurality of prismatic battery cells to enable the prismatic battery cell to expand into an additional space in the housing.

8. The battery module of claim 1, wherein each prismatic battery cell of the plurality of prismatic battery cells is separated from an adjacent prismatic battery cell of the plurality of prismatic battery cells by a cell spacer.

9. The battery module of claim 8, wherein the cell spacer is electrically insulating.

10. The battery module of claim 1, wherein the plurality of prismatic battery cells comprise lithium ion battery cells.

11. The battery module of claim 1, wherein the cell stack comprises a first column comprising a first half of the plurality of prismatic battery cells and a second column adjacent to the first column comprising a second half of the plurality of prismatic battery cells.

12. The battery module of claim 1, wherein the housing comprises a first portion defining a space in which the compressed cell assembly is disposed, the first portion surrounding and contacting the compressed cell assembly on only three sides.

13. The battery module of claim 1, wherein the first and second retaining walls are not integrated into or fastened to the housing.

14. A battery module, comprising:
a housing comprising a first interior surface and a second interior surface opposite the first interior surface spaced apart by a fixed distance;
a plurality of prismatic battery cells disposed in an interior space of the housing of the battery module, wherein each of the plurality of prismatic battery cells has a substantially inflexible metallic packaging, and wherein the plurality of prismatic battery cells are arranged in a cell stack comprising a first end and a second end;
a first retaining wall disposed between the first end of the cell stack and the first interior surface of the housing; and
a second retaining wall disposed between the second end of the cell stack and the second interior surface of the housing;
wherein the battery module does not include an actuating clamping mechanism, and wherein the first and second retaining walls and the housing are configured to cooperate to maintain compression of the cell stack, and wherein the first interior surface of the housing comprises protrusions in contact with only a portion of a surface of the first retaining wall, and wherein the battery module comprises a circuit board mounted to the surface of the first retaining wall in a region not in contact with the first interior surface of the housing.

15. The battery module of claim 14, wherein the first and second retaining walls are configured to enable compression of the cell stack prior to installation of the cell stack within the housing, and wherein the first and second retaining walls and the housing are configured to maintain compression of the cell stack after installation of the cell stack and the first and second retaining walls within the housing.

16. The battery module of claim 14, wherein the first and second retaining walls each comprise one or more slots configured to temporarily engage an external actuating clamping mechanism to compress the compressed cell assembly prior to insertion into the housing.

17. The battery module of claim 14, wherein the first and second retaining walls are constructed from glass or glass-filled polymer.

18. The battery module of claim 14, wherein the first and second retaining walls each comprise a crumple zone configured to absorb pressure created by battery cell venting.

19. The battery module of claim 14, wherein the first and second retaining walls prevent each of the plurality of prismatic battery cells from expanding during operation of the battery module.

20. The battery module of claim 14, wherein the first and second retaining walls are not integrated into or coupled to the housing.

21. The battery module of claim 1, wherein the plurality of prismatic battery cells are arranged in a horizontal cell stack.

22. A battery module, comprising:
a polymer housing;
a compressed cell assembly disposed within an interior of the polymer housing, comprising:
a plurality of prismatic battery cells arranged in a cell stack; and
a plurality of retaining walls, each comprising:
a respective first surface that contacts the cell stack;
a respective second surface, opposite the respective first surface, that contacts an interior surface of the polymer housing; and
one or more respective slots configured to temporarily engage an external actuating clamping mechanism to compress the cell stack and dispose the cell stack in the interior of the polymer housing, and wherein, within the interior of the polymer housing, the plurality of retaining walls maintain a compression force within the compressed cell assembly without the battery module having an internal actuating clamping mechanism, wherein the interior surface of the polymer housing comprises protrusions that contact only a portion of the respective second surface of a first retaining wall of the plurality of retaining walls, and wherein the battery module comprises a circuit board mounted to the respective second surface of the first retaining wall in a region not in contact with the interior surface of the polymer housing.

23. The battery module of claim 22, wherein each of the plurality of retaining walls consists essentially of a glass-filed polymer.

24. The battery module of claim 22, wherein each of the plurality of retaining walls consists essentially of glass.

* * * * *

UNITED STATES PATENT AND TRADEMARK OFFICE
CERTIFICATE OF CORRECTION

| | | |
|---|---|---|
| PATENT NO. | : 9,911,951 B2 | |
| APPLICATION NO. | : 14/501241 | |
| DATED | : March 6, 2018 | |
| INVENTOR(S) | : Richard M. DeKeuster et al. | |

It is certified that error appears in the above-identified patent and that said Letters Patent is hereby corrected as shown below:

In the Drawings

1. In Fig. 11, Sheet 7 of 9, for Tag "202", in Line 1, delete "PULARITY" and insert -- PLURALITY --, therefor.

In the Specification

2. In Column 1, Line 31, delete "systems" and insert -- electric vehicles --, therefor.

3. In Column 1, Line 34, delete "systems" and insert -- electric vehicles --, therefor.

4. In Column 11, Line 53, delete "120 and 122" and insert -- 120 and 124 --, therefor.

5. In Column 11, Line 55, delete "120 and 122" and insert -- 120 and 124 --, therefor.

6. In Column 13, Line 8, delete "spacers 100" and insert -- spacers 94 --, therefor.

7. In Column 17, Line 10, delete "batter" and insert -- battery --, therefor.

8. In Column 17, Line 35, delete "cell assembly 130" and insert -- cell assembly 103 --, therefor.

Signed and Sealed this
Twenty-fourth Day of April, 2018

Andrei Iancu
*Director of the United States Patent and Trademark Office*